(12) United States Patent
Tasaki

(10) Patent No.: US 10,521,193 B2
(45) Date of Patent: Dec. 31, 2019

(54) MONITORING SYSTEM AND MONITORING METHOD

(71) Applicant: OMRON Corporation, Kyoto-shi, Kyoto (JP)

(72) Inventor: Hiroshi Tasaki, Soraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 174 days.

(21) Appl. No.: 15/114,574

(22) PCT Filed: Jan. 21, 2015

(86) PCT No.: PCT/JP2015/051559
§ 371 (c)(1),
(2) Date: Jul. 27, 2016

(87) PCT Pub. No.: WO2015/118946
PCT Pub. Date: Aug. 13, 2015

(65) Prior Publication Data
US 2016/0342392 A1    Nov. 24, 2016

(30) Foreign Application Priority Data

Feb. 10, 2014  (JP) .................. 2014-023247

(51) Int. Cl.
*G06F 7/20* (2006.01)
*G06F 16/901* (2019.01)
(Continued)

(52) U.S. Cl.
CPC ............. *G06F 7/20* (2013.01); *G05B 23/024* (2013.01); *G06F 16/9024* (2019.01); *G06Q 10/0639* (2013.01); *G05B 2223/02* (2018.08)

(58) Field of Classification Search
USPC ........................................ 707/748
See application file for complete search history.

(56) References Cited

U.S. PATENT DOCUMENTS

2005/0288915 A1\* 12/2005 Hines ............... G06F 17/50
703/17
2007/0180324 A1\* 8/2007 Nakamura ......... G05B 23/024
714/37
(Continued)

FOREIGN PATENT DOCUMENTS

| CN | 101169633 A | 4/2008 |
| CN | 201705397 U | 1/2011 |

(Continued)

OTHER PUBLICATIONS

Chinese Office Action dated Feb. 8, 2018 in a counterpart Chinese patent application.

(Continued)

*Primary Examiner* — Muluemebet Gurmu
(74) *Attorney, Agent, or Firm* — Metrolex IP Law Group, PLLC

(57) ABSTRACT

Provided is a monitoring system including an operation results acquisition unit that acquires time series data of each of a plurality of indexes that indicate operation results of a monitoring target; an overall index generation unit that produces time series data of an overall index by combining a plurality of index values at a same time point based on the time series data of each of the plurality of indexes; and a change point detection unit that analyzes the time series data of the overall index, and detects a point where a significant change appears in the overall index values, as a change point in a status of the monitoring target.

5 Claims, 11 Drawing Sheets

(51) Int. Cl.
  *G05B 23/02* (2006.01)
  *G06Q 10/06* (2012.01)

(56) References Cited

U.S. PATENT DOCUMENTS

| | | | | |
|---|---|---|---|---|
| 2008/0103715 | A1* | 5/2008 | Tsuda | G07C 3/00 |
| | | | | 702/81 |
| 2009/0094080 | A1* | 4/2009 | Luotojarvi | G06Q 10/00 |
| | | | | 705/7.15 |
| 2012/0166142 | A1 | 6/2012 | Maeda et al. | |
| 2013/0103657 | A1* | 4/2013 | Ikawa | G06F 17/30985 |
| | | | | 707/693 |

FOREIGN PATENT DOCUMENTS

| | | |
|---|---|---|
| CN | 102576433 A | 7/2012 |
| CN | 103472802 A | 12/2013 |
| CN | 103534658 A | 1/2014 |
| JP | H07-105285 A | 4/1995 |
| JP | 2000-123085 A | 4/2000 |
| JP | 2005-149006 A | 6/2005 |
| JP | 2007-165721 A | 6/2007 |
| JP | 4218363 B2 | 2/2009 |
| JP | 2009-294146 A | 12/2009 |
| JP | 2011-059790 A | 3/2011 |
| JP | 2013-088828 A | 5/2013 |
| WO | 2012/090492 A1 | 7/2012 |

OTHER PUBLICATIONS

Extended European search report dated Aug. 30, 2017 in the counterpart European patent application.
Chinese Office Action dated Jul. 18, 2018 in a counterpart Chinese Patent application.

* cited by examiner

EMBODIMENT OF THE INVENTION

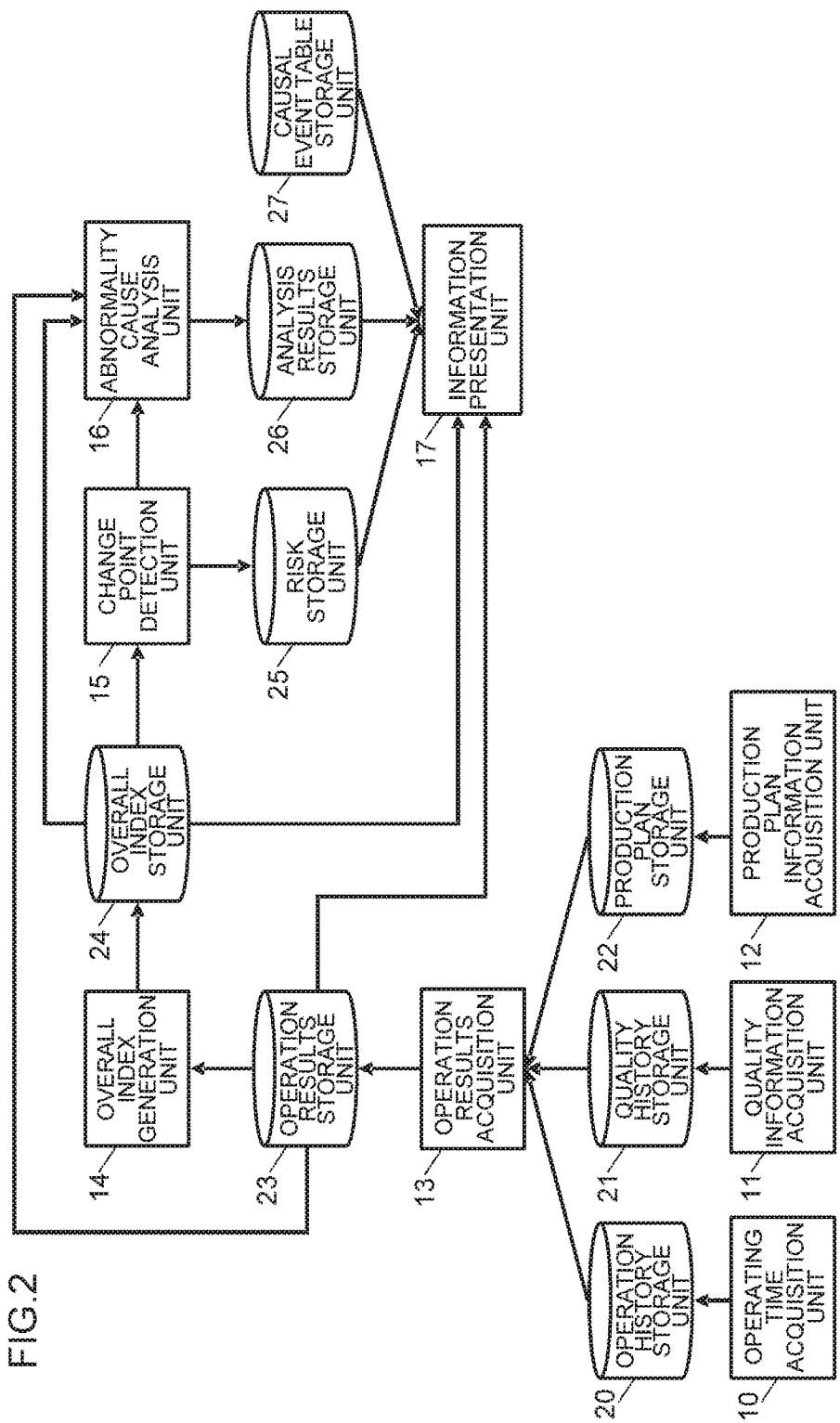

FIG.3(A)
OPERATION HISTORY

| DATE/TIME | STATUS |
|---|---|
| 2013-09-10 07:00:00 | OPERATION STARTED |
| 2013-09-10 12:30:00 | STOP |
| 2013-09-10 12:45:00 | OPERATION STARTED |
| 2013-09-10 15:43:20 | STOP |
| 2013-09-10 15:44:43 | OPERATION STARTED |
| ... | ... |

FIG.3(B)
QUALITY HISTORY

| DATE/TIME | GOOD PIECES | REJECT PIECES |
|---|---|---|
| 2013-09-10 07:00:00 | 28 | 2 |
| 2013-09-10 07:01:00 | 30 | 2 |
| 2013-09-10 07:02:00 | 33 | 0 |
| ... | ... | ... |

FIG.3(C)
PRODUCTION PLAN INFORMATION

| DATE | OPERATION | PLANNED STOP 1 | PLANNED STOP 2 | ... |
|---|---|---|---|---|
| 2013-09-10 | 07:00:00 - 22:00:00 | 12:30:00 - 12:45:00 | 17:00:00 - 17:15:00 | .. |
| 2013-09-11 | 07:00:00 - 22:00:00 | 12:30:00 - 12:45:00 | 17:00:00 - 17:15:00 | ... |
| 2013-09-12 | 07:00:00 - 19:00:00 | 12:30:00 - 12:45:00 | .. | .. |
| ... | .. | .. | ... | ... |

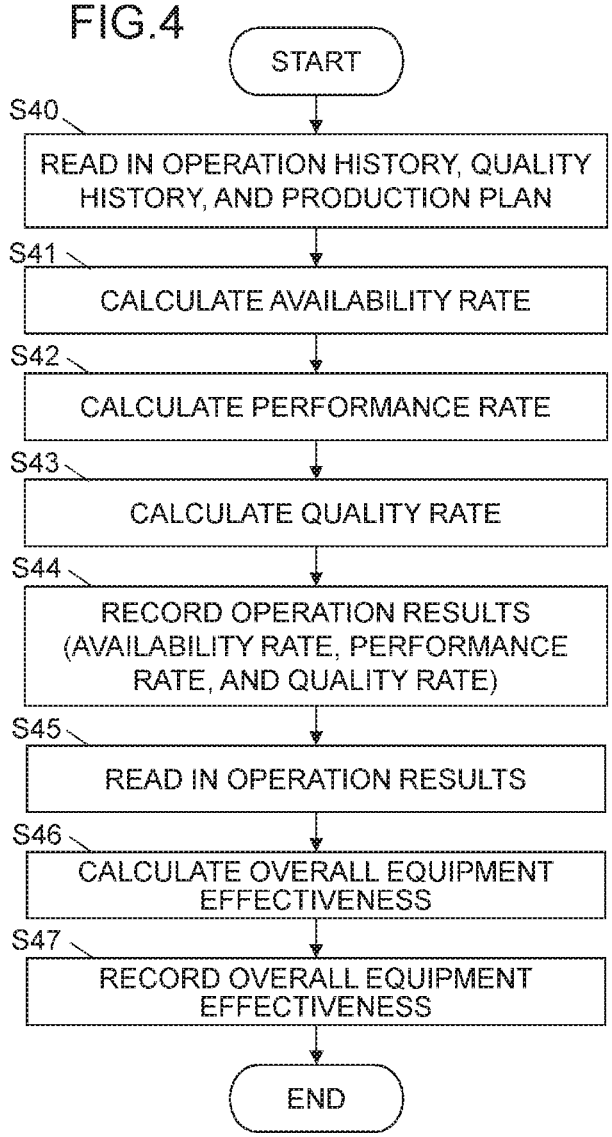

FIG.5(A)
OPERATION RESULTS INDEX

| DATE/TIME | EQUIPMENT ID | AVAILABILITY RATE | PERFORMANCE RATE | QUALITY RATE |
|---|---|---|---|---|
| 2013-09-10 11:25:00 | A | 0.85 | 0.91 | 0.85 |
| 2013-09-10 11:35:00 | A | 0.91 | 0.85 | 0.91 |
| 2013-09-10 11:45:00 | A | 0.82 | 0.82 | 0.82 |
| ... | ... | ... | ... | ... |

FIG.5(B)
OVERALL INDEX

| DATE/TIME | EQUIPMENT ID | OVERALL EQUIPMENT EFFECTIVENESS |
|---|---|---|
| 2013-09-10 11:25:00 | A | 0.66 |
| 2013-09-10 11:35:00 | A | 0.70 |
| 2013-09-10 11:45:00 | A | 0.55 |
| ... | ... | ... |

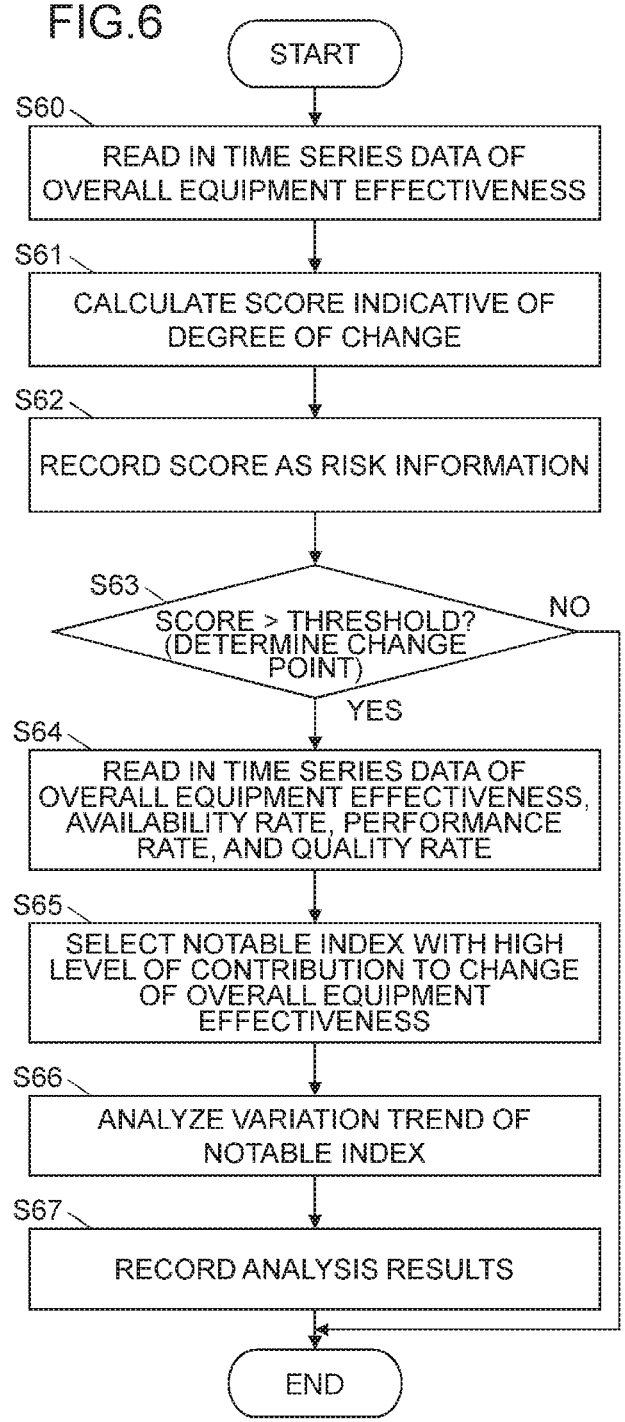

FIG.7(A)
ANALYSIS RESULTS

| TRIGGER ID | DATE/TIME | EQUIPMENT ID | AVAILABILITY RATE | PERFORMANCE RATE | QUALITY RATE |
|---|---|---|---|---|---|
| 1 | 2013-09-10 11:25:00 | A | 1 LINEAR TREND | 0 - | 0 - |
| 2 | 2013-09-16 18:15:00 | A | 0 - | 1 SUDDEN TREND | 0 - |
| ... | ... | ... | ... | ... | ... |

FIG.7(B)
ANOTHER ANALYSIS RESULTS EXAMPLE

| TRIGGER ID | DATE/TIME | EQUIPMENT ID | AVAILABILITY RATE | PERFORMANCE RATE | QUALITY RATE |
|---|---|---|---|---|---|
| 1 | 2013-09-10 11:25:00 | A | 1 LINEAR TREND | 2 CYCLIC TREND | 0 - |
| 2 | 2013-09-16 18:15:00 | A | 3 LINEAR TREND | 1 SUDDEN TREND | 2 SUDDEN TREND |
| 3 | 2013-09-22 09:45:00 | A | 0 - | 0 - | 1 SUDDEN TREND |
| ... | ... | ... | ... | ... | ... |

FIG.8
CAUSAL EVENT TABLE

| INDEX | VARIATION TREND | CAUSAL EVENTS |
|---|---|---|
| AVAILABILITY RATE | LINEAR TREND | WEAR OF PARTS |
| AVAILABILITY RATE | SUDDEN TREND | ... |
| ... | ... | ... |
| PERFORMANCE RATE | CYCLIC TREND | PROBLEM IN LINKAGE BETWEEN PROCESSES |
| ... | ... | ... |

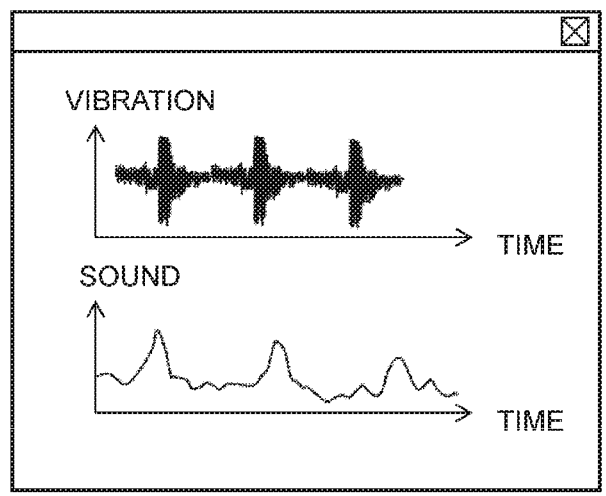

MONITORING SYSTEM AND MONITORING METHOD

TECHNICAL FIELD

The present invention relates to a technique for monitoring the status of a monitoring target and detecting an abnormality.

BACKGROUND ART

Monitoring systems that monitor data obtained from a plurality of sensors, and detect an abnormality in production equipment or analyze the cause of the abnormality have hitherto been proposed (see PTL 1 to 3). However, conventional monitoring systems presuppose installation of sensors in a monitoring target, and therefore they have to be designed specifically in accordance with the configuration of the monitoring target. Also, when introducing a monitoring system into existing equipment, costs for the remodeling of the equipment or the like arise. Moreover, special knowledge of the configuration of the monitoring target and sensing technology is required so as to make good use of the data collected from many sensors for abnormality detection and maintenance.

CITATION LIST

Patent Literature

PTL 1: Japanese Patent Application Laid-open No. 2013-088828
PTL 2: Japanese Patent Application Laid-open No. 2011-059790
PTL 3: Japanese Patent Application Laid-open No. 2009-294146

SUMMARY OF INVENTION

Technical Problem

The present invention was made in view of the circumstances described above, its object being to provide a technique for enabling easy realization of monitoring of the status of a monitoring target and correct detection of a change in the status that can be an abnormality or a predictor thereof.

Solution to Problem

The monitoring system is characterized in that it includes: an operation results acquisition unit that acquires time series data of each of a plurality of indexes that indicate operation results of a monitoring target; an overall index generation unit that produces time series data of an overall index by combining a plurality of index values at a same time point based on the time series data of each of the plurality of indexes; and a change point detection unit that analyzes the time series data of the overall index, and detects a point where a significant change appears in the overall index values, as a change point in a status of the monitoring target.

"Operation results of the monitoring target" do not mean internal actions of the monitoring target but refer to the outputs (output or outcome) from the monitoring target observable from outside of the monitoring target. For example, if the monitoring target is production equipment, the operation results of the production equipment can be observed from the operation history of the production equipment (temporal records of operations and stops, etc.), quality history (numbers of good pieces and reject pieces, quality rate, etc.), and production plan (time of starting and ending operations, time of starting and ending planned stops, etc.). As indexes of the operation results, for example, availability rate, performance rate, and quality rate may be used.

According to the monitoring system, the monitoring of the status of a monitoring target can be realized only by an observation of the operation results of the monitoring target. Since a change point is detected with the use of an overall index obtained by combining a plurality of indexes, a change in the status of the monitoring target that may be difficult to evaluate from individual indexes can be correctly detected. Further advantages of the monitoring system are higher versatility, applicability, and extendibility, because it is no longer essential to install an observation system such as sensors inside the monitoring target.

The monitoring system is characterized in that it further includes a cause analysis unit that analyzes the time series data of the plurality of indexes and the time series data of the overall index when a change point is detected in the status of the monitoring target by the change point detection unit, and selects, from the plurality of indexes, one or more indexes with a high level of contribution to the change in the overall index at the change point as a notable index relevant to a cause of the change in the status of the monitoring target. According to the monitoring system, a notable index is specified by the level of contribution to the change in the overall index based on an analysis of time series data, so that the cause of the abnormality that may be difficult to determine from individual indexes can be easily and correctly found out.

The monitoring system is characterized in that it further includes an information presentation unit that outputs information regarding the notable index. The monitoring system can provide useful information for the user to specify the cause of the change in the status of the monitoring target. Therefore, users without special knowledge can also easily understand and deal with a problem.

The monitoring system is characterized in that the information presentation unit outputs a graph of time series data of the notable index. The monitoring system can provide useful information for the user to specify the cause of the change in the status of the monitoring target. Therefore, users without special knowledge can also easily understand and deal with a problem.

The monitoring system is characterized in that the cause analysis unit analyzes a variation trend of the time series data of the notable index, and specifies a causal event as an assumed cause of the change in the status of the monitoring target based on this variation trend. According to the monitoring system, the cause of the change in the status of the monitoring target can be determined automatically.

The monitoring system is characterized in that the information presentation unit outputs information regarding the specified causal event. The monitoring system can provide useful information for the user to specify the cause of the change in the status of the monitoring target. Therefore, users without special knowledge can also easily understand and deal with a problem.

The monitoring system is characterized in that it further includes a process execution unit that executes a process for dealing with the causal event. According to the monitoring system, the problem arising in the monitoring target can be resolved automatically.

The monitoring method is characterized in that it includes: an operation results acquisition step in which a computer acquires time series data of each of a plurality of indexes that indicate operation results of a monitoring target; an overall index generation step in which the computer produces time series data of an overall index by combining a plurality of index values at a same time point based on the time series data of each of the plurality of indexes; and a change point detection step in which the computer analyzes the time series data of the overall index, and detects a point where a significant change appears in the overall index values, as a change point in a status of the monitoring target.

According to the monitoring method, the monitoring of the status of the monitoring target can be realized only by an observation of the operation results of the monitoring target. Since a change point is detected with the use of an overall index obtained by combining a plurality of indexes, a change in the status of the monitoring target that may be difficult to evaluate from individual indexes can be correctly detected. Further advantage is that the method eliminates the necessity of installing an observation system such as sensors inside the monitoring target.

The program is characterized in that it causes a computer to execute each of the steps of the monitoring method.

Advantageous Effects of Invention

The present invention enables easy realization of monitoring of the status of a monitoring target and correct detection of a change in the status that may be an abnormality, or a predictor thereof.

BRIEF DESCRIPTION OF DRAWINGS

[FIG. 2] A functional block diagram of the monitoring system.

[FIG. 3] An example of operation history data, quality history data, and production plan information.

[FIG. 4] A flowchart showing the process flow of the operation results acquisition unit and overall index generation unit.

[FIG. 5] An example of time series data of operation results index and overall index.

[FIG. 6] A flowchart showing the process flow of the change point detection unit and abnormality cause analysis unit.

[FIG. 7] An example of analysis results data accumulated in the analysis results storage unit.

[FIG. 8] An example of a causal event table stored in the causal event table storage unit.

[FIG. 11] An example of information output screen output from the information presentation unit.

DESCRIPTION OF EMBODIMENTS

The monitoring system according to one embodiment of the present invention relates to a technique for constantly monitoring the status of a monitoring target, and detecting an abnormality or a predictor thereof or analyzing the cause of the abnormality. One characteristic feature of the monitoring system of this embodiment is that time series data of a plurality of indexes indicative of operation results of the monitoring target are utilized for the monitoring of the status and detection of an abnormality or a predictor thereof. FIG. 1 is a schematic diagram illustrating the difference in approach between a typical conventional monitoring system and the monitoring system of the embodiment of the invention in respect of this characteristic feature.

Figure 1A:
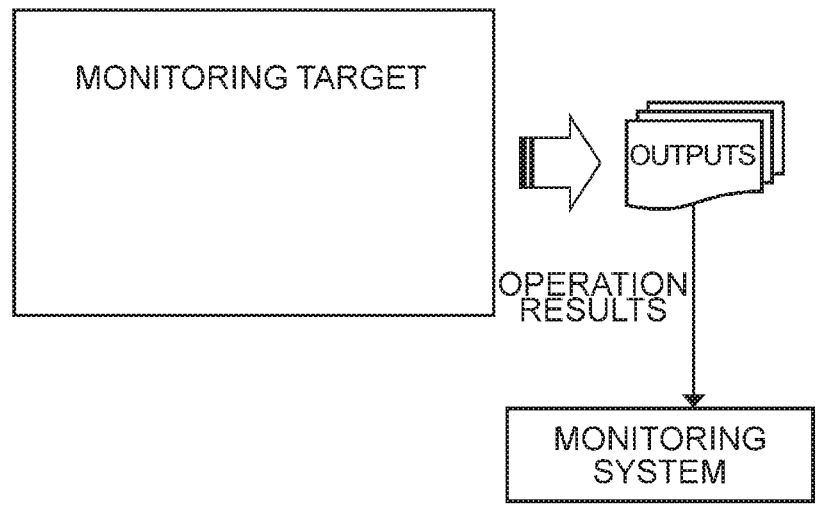
[FIG. 1] A diagram for explaining the difference in approach between a typical conventional monitoring system and a monitoring system according to the embodiment of the invention.
Figure 1B:
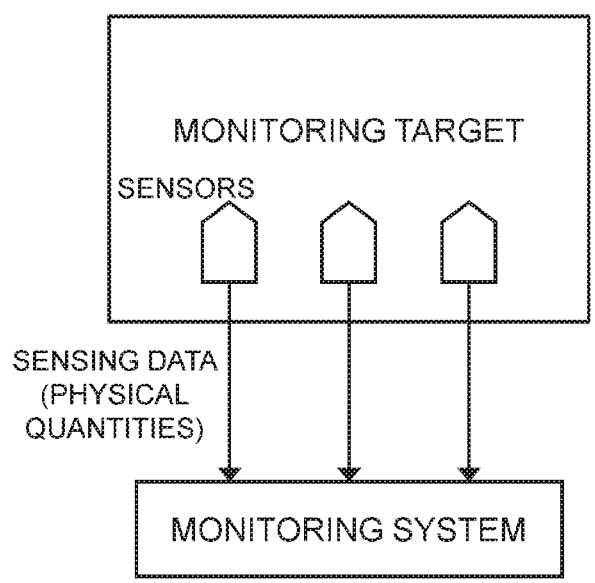

In the conventional monitoring system, as shown in FIG. 1(B), it is the common approach to set various sensors in the monitoring target to monitor physical quantities of actions in the monitoring target itself (sensing data). There are various means depending on purposes, for example, a temperature sensor may detect a malfunction of a heater or temperature adjustment control system, or voltage changes may be monitored to detect an overload of an actuator. While this conventional approach offers the advantage of direct detection of an abnormality in the actions of various parts of the monitoring target, it entails the following problems. Firstly, the monitoring system is poor in versatility (has narrow applicability). This is because the monitoring system needs to be designed in accordance with the monitoring target, since the types of sensors, installation points, processing methods of sensing data, abnormality detection logics, and the like differ completely depending on the configuration, actions, or sensing targets of the object of monitoring. Secondly, the system is poor in applicability and extendibility with respect to existing equipment. For example, where introduction of a new monitoring system into existing production equipment is desired, such introduction may be impractical because of physical difficulties in attachment of sensors, or significant cost required for the remodeling of the existing equipment. Thirdly, the system requires special knowledge of sensing. Namely, without correct understanding of what physical quantities of which parts in the monitoring target the individual sensors are monitoring, and what meanings the sensing data values each have, it is not possible to specify the cause of the abnormality, or take appropriate measures.

In contrast, the monitoring system of this embodiment monitors and analyzes the operation results of the monitoring target as shown in FIG. 1(A), and assumes that there is an internal abnormality, or a predictor thereof, in the monitoring target. The advantage of this approach, above all, is that it eliminates the necessity of installing an observation system inside the monitoring target as with conventional methods, since it is only necessary to observe the operation results from outside of the monitoring target. Therefore, the system offers high versatility and flexibility as it is applicable to all kinds of monitoring targets, and facilitates retrofitting and extension to existing equipment. (While installation of sensors is not essential, supplemental sensors may be provided as required.) Secondly, there is the advantage that no special knowledge of sensing is required.

A preferred embodiment of the present invention will be described below with respect to one example of a specific configuration, which is a monitoring system that monitors the status of production equipment in FA (Factory Automation) system.

<System Configuration>

In production sites, for safe and normal operation of various pieces of equipment associated with the production, it is essential to constantly monitor the status of equipment and to take appropriate measures as required to prevent failures, accidents, and other malfunctions (such activities are referred to as preventive maintenance). The monitoring system of this embodiment is a system that provides tools for, for example, detecting an abnormality or a predictor thereof in production equipment, analyzing the cause of the abnormality, and presenting the analysis results, to assist proper execution of preventive maintenance.

FIG. 2 shows the functional block of the monitoring system. The monitoring system 1 includes functions such as an operating time acquisition unit 10, a quality information acquisition unit 11, a production plan information acquisition unit 12, an operation results acquisition unit 13, an overall index generation unit 14, a change point detection unit 15, an abnormality cause analysis unit 16, and an information presentation unit 17. The monitoring system 1 also includes, as data storage means, an operation history storage unit 20, a quality history storage unit 21, a production plan storage unit 22, an operation results storage unit 23, an overall index storage unit 24, a risk storage unit 25, an analysis results storage unit 26, and a causal event table storage unit 27.

The monitoring system 1 can be configured by a general-purpose computer system including a CPU (central processing unit), a main storage device (memory), an auxiliary storage device (hard disk, semiconductor disk, etc.), an input device (keyboard, mouse, touchscreen, etc.), a display device (liquid crystal monitor, etc.), and a communication IF. Various function blocks shown in FIG. 2 are realized as the CPU loads a program stored in the auxiliary storage device to the main storage device and executes it. The storage units 20 to 26 are provided in the auxiliary storage device. While this embodiment shows an example in which the monitoring system is configured with a single computer, the system may be configured with a plurality of computers, or some or all of the function blocks or storage units may be implemented by servers on a network. The system may also take the form of a so-called cloud computing or grid computing.

The operating time acquisition unit 10 is a function of acquiring operating time information from the production equipment 2. Operating time information is temporal records of operations and stops of the production equipment 2. For example, the operating time acquisition unit 10 may acquire the status of production equipment 2 (whether it is running or stopped) at a predetermined time interval (once every several seconds, several tens of seconds or the like), or may acquire the status when the status is switched from one to another, such as when the operation is started or ended, or when the equipment is stopped and restarted due to an abnormality. The operating time information thus acquired is stored in the operation history storage unit 20. FIG. 3(A) shows an example of operation history data stored in the operation history storage unit 20. In this example, time series data of date and time (when the status changed) corresponded to status is recorded.

The quality information acquisition unit 11 is a function of acquiring quality information from the production equipment 2. The quality information is records of quality of the products produced by the production equipment 2. The information may be records of each product being good or rejected, or records of numbers of good pieces and reject pieces per unit time, or quality rate. The quality information thus acquired is stored in the quality history storage unit 21. FIG. 3(B) shows an example of quality history data stored in the quality history storage unit 21. In this example, the numbers of good pieces and reject pieces per minute are recorded in time series.

The production plan information acquisition unit 12 is a function of acquiring production plan information from the production equipment 2. The production plan information is records of production plans of the production equipment 2. Specifically, it is records of start time and end time of operation, and start time and end time of planned stops, for every day. The production plan information thus acquired is stored in the production plan storage unit 22. FIG. 3(C) shows an example of production plan information stored in the production plan storage unit 22.

The operation results acquisition unit 13 is a function of generating time series data of operation results of the production equipment 2 based on the operation history, quality history, and production plans. In this embodiment, three indexes, "availability rate", "performance rate", and "quality rate", are used to indicate operation results. The availability rate indicates the percentage of the normal operating time of the production equipment 2, performance rate indicates the percentage of actual production time of the production equipment 2, and quality rate indicates the percentage of good pieces produced by the production equipment 2. The time series data of these indexes are stored in the operation results storage unit 23.

The overall index generation unit 14 is a function of generating time series data of "overall equipment effectiveness", which is an overall index, by combining the time series data of the three indexes representing the operation results. The time series data of the overall equipment effectiveness is stored in the overall index storage unit 24.

The change point detection unit 15 is a function of analyzing the time series data of the overall equipment effectiveness, and detecting a point where a significant change appears in the values of the overall equipment effectiveness, as a change point in the status of the production equipment 2. The information of the detected change point (trigger information) is given to the abnormality cause analysis unit 16.

The abnormality cause analysis unit 16 is a function of analyzing the time series data of respective indexes during a predetermined immediate period when a change point is detected in the status of the production equipment 2, and selecting, from the three indexes, availability rate, performance rate, and quality rate, one or more indexes with a high level of contribution to the change in the overall equipment effectiveness at the change point, as a notable index. This notable index is an index that has high relevance to the cause of the change in the status of the production equipment 2. The analysis results of the abnormality cause analysis unit 16 are stored in the analysis results storage unit 26.

The information presentation unit 17 is a function of presenting information useful for preventive maintenance to a user. The information presentation unit 17 may show the information on a display device provided in the monitoring system 1, or transmit the information to an external device such as an operator terminal or production equipment 2.

<Monitoring Process>

Next, specific actions of the monitoring system 1 will be described.

(1) Generation of Time Series Data of Operation Results and Overall Equipment Effectiveness FIG. 4 shows an example of the process flow of the operation results acquisition unit 13 and overall index generation unit 14. The process of FIG. 4 is a process of calculating values of the operation results (availability rate, performance rate, and quality rate) and overall equipment effectiveness at time t. This process is executed at a predetermined time interval $\Delta t$, so that time series data are generated with a step width of $\Delta t$. The value $\Delta t$ may be set in accordance with the required monitoring interval (how frequently the status of the production equipment 2 should be monitored). In this embodiment, Δt=10 minutes. The values of the operation results and overall equipment effectiveness at time t are calculated with the use of data during a predetermined period of p minutes immediately before time t (i.e., data from time t-p to time p). The value p may be any value, but when the value p is small, noise in the time series data tends to increase and the possibility of erroneous detection of change points increases, while, when the value p is large, the time series data is smoothed and the sensitivity of detecting change points may be lowered. Thus, p should be suitably set based on a good balance between erroneous detection potential and sensitivity. In this embodiment, p=60 minutes. In the following description, p will be referred to as "unit period".

First, the operation results acquisition unit 13 reads in data of operation history for the unit period of p minutes, quality history for the unit period of p minutes, and today's production plan from the operation history storage unit 20, quality history storage unit 21, and production plan storage unit 22, respectively (step S40). The operation results acquisition unit 13 then calculates the availability rate, performance rate, and quality rate at time t based on these data (step S41 to S43).

In this embodiment, various terms are defined as follows:
availability rate=operating time/planned production time
performance rate=net operating time/planned production time
quality rate=good pieces/total pieces during a unit period p, where
planned production time=unit period p−planned downtime during unit period p
operating time=planned production time−unplanned downtime during unit period p
net operating time=operating time−minor downtime during unit period p
total pieces=total units produced during unit period p
good pieces=total pieces−reject pieces produced during unit period p Unplanned downtime refers to a stop due to an abnormality in the production equipment 2 and involves a long-time stop for determination of causes, repair, replacement and the like. Minor downtime refers to a stop during normal operation of the production equipment 2 for simple, short-time measures such as removal of work piece or resetting to be taken before the restart (also referred to as small stops). The operating time information acquired from the production equipment 2 may include status information that specifies unplanned downtime or minor downtime. In this embodiment, however, unplanned downtime (stops of 5 minutes or more) is distinguished from minor downtime (stops of less than 5 minutes) simply by the length of the stops.

The availability rate, performance rate, and quality rate are represented as values inclusively between 0 and 1, and the closer to 1, the better. Calculated values of availability rate, performance rate, and quality rate are added to the time series data in the operation results storage unit 23 together with time t and ID of the production equipment 2 (step S44). FIG. 5(A) shows an example of the time series data of operation results indexes accumulated in the operation results storage unit 23.

Next, the overall index generation unit 14 reads in the data of availability rate, performance rate, and quality rate at time t from the operation results storage unit 23 (step S45). An overall equipment effectiveness value is then determined from the following equation (step S46).

overall equipment effectiveness=availability rate×performance rate×quality rate

Overall equipment effectiveness, which is the overall index, is also represented as a value inclusively between 0 and 1, and the closer to 1, the better. The calculated value of overall equipment effectiveness is added to the time series data in the overall index storage unit 24 together with time t and ID of the production equipment 2 (step S47). FIG. 5(B) shows an example of the time series data of overall indexes accumulated in the overall index storage unit 24.

(2) Change Point Detection and Cause Analysis

FIG. 6 shows an example of the process flow of the change point detection unit 15 and abnormality cause analysis unit 16. The process of FIG. 6 is a process of detecting a change in the status at time t based on the time series data of the overall equipment effectiveness, and analyzing the cause of the detected change in the status. The process of FIG. 6 should be executed every time the time series data of the overall equipment effectiveness is renewed (in this embodiment, at the monitoring interval Δt=10 minutes).

First, the change point detection unit 15 reads in the time series data of the overall equipment effectiveness from the overall index storage unit 24 (step S60). For the detection of a change point, all the data before time t may be used, or only part of the data such as data of a predetermined period (e.g., of several days or several weeks) or data of the day may be used.

The change point detection unit 15 analyzes the time series data and calculates a score indicative of the degree of change of the value of overall equipment effectiveness at time t relative to the values of overall equipment effectiveness before time t (step S61). Various algorithms have been proposed for detecting a change point in time series data. Any of know algorithms may be used. For example, the difference (absolute value) between an average value of time series data before time t and the value at time t may be used as the score. Using a statistical testing method such as t-testing, or a Bayesian method of change point detection with a sampling technique to build a probabilistic model of data generation, the probability of occurrence of the value at time t may be calculated and used as the score. The difference (absolute value) between an estimated value at time t determined from past data using a time series model such as an AR model and the actual value may be used as the score. Alternatively, the time series data of the overall equipment effectiveness may be frequency-resolved and the intensity of a predetermined frequency component may be used as the score.

This score can be regarded as an index indicative of the degree of risk of an abnormality occurring in the production equipment 2. The score at time t determined at step S61 is recorded in the risk storage unit 25 as risk information (step S62).

Next, the change point detection unit 15 compares the score determined at step S61 with a threshold, and determines that time t is a "change point" when the score exceeds the threshold (step S63). When the score exceeds the threshold, namely, when a significant change is observable in the time series data of overall equipment effectiveness, it is highly probable that some sort of abnormality has occurred or is going to occur in the production equipment 2. Therefore, detection of a change point at step S63 is used as a trigger to proceed to the analysis of the cause of abnormality.

The abnormality cause analysis unit 16 reads in the time series data of overall equipment effectiveness from the overall index storage unit 24, as well as reads in the respective time series data of availability rate, performance rate, and quality rate from the operation results storage unit 23 (step S64). For the analysis of the cause of abnormality, all the time series data before the trigger (time t) may be used, or only the data of a predetermined period (e.g., of several weeks or several months) may be used.

Next, the abnormality cause analysis unit 16 analyzes the time series data of overall equipment effectiveness, availability rate, performance rate, and quality rate, and selects one or more indexes from the three indexes, availability rate, performance rate, and quality rate, with a high level of contribution to the change in the overall equipment effectiveness at the trigger (time t) as a notable index (step S65). At this time, only one index with a highest contribution level may be selected as a notable index, or a plurality of indexes having a contribution level that is higher than a preset threshold may be selected as notable indexes.

Any known algorithm may be used for the evaluation of contribution level of each index. To give an example, regression analysis may be conducted to calculate respective partial regression coefficients of the indexes relative to the overall equipment effectiveness, and the absolute values of the partial regression coefficients may be used as the respective levels of contribution of the indexes relative to the overall equipment effectiveness. Alternatively, an inner product of frequency-resolved time series data of overall equipment effectiveness and frequency-resolved time series data of an index may be handled as the level of contribution of the index under analysis. Optionally, instead of evaluating a level of contribution for each index, the contribution level may be evaluated for each set of a plurality of indexes. For example, composite time series data may be created by combining time series data of a plurality of indexes, and partial regression coefficients or inner products of the composite index may be calculated using the time series data of overall equipment effectiveness and the composite time series data.

Next, the abnormality cause analysis unit 16 further analyzes the time series data of the extracted notable index, and determines which of "linear", "sudden", or "cyclic" trends is found in the variation of the notable index at the time of the trigger (time t) (step S66). A "linear" trend is when values change substantially linearly (such as monotonic increase or decrease), a "sudden" trend is a particular change in the values, and a "cyclic" trend refers to regular increases and decreases of the value.

The analysis results of the abnormality cause analysis unit 16 are stored in the analysis results storage unit 26 (step S67). FIG. 7(A) shows an example of analysis results data accumulated in the analysis results storage unit 26. The analysis results include information such as a trigger ID, date and time when the trigger was generated, ID of the production equipment 2, a flag that shows notable index(es), and variation trend of the notable index(es). One can see from the first line of the analysis results in FIG. 7(A) that a change in the status was detected at 11 h, 25 min, 00 sec on Sep. 10, 2013 at production equipment with ID:A, the notable index assumed to be the cause of the change is availability rate, and the notable index showed the linear trend in the variation. FIG. 7(B) shows a variation example of analysis results, wherein, when a plurality of notable indexes have been extracted for one trigger, the rank of contribution levels is recorded for each notable index in the analysis results.

FIG. 8 shows an example of a causal event table stored in the causal event table storage unit 27. The causal event table is a table in which "types of indexes", "trends in variation", and possible "causal events" are corresponded to one another, and looked up when the information presentation unit 17 outputs analysis results. In the example of FIG. 8, "wear of parts" is corresponded as a causal event when the "availability rate" shows a "linear" trend in the variation, and "problem in linkage between processes" is corresponded as a causal event when the "performance rate" shows a "cyclic" trend in the variation.

(3) Output of Analysis Results

One example of an information output screen generated by the information presentation unit 17 is shown.

Figure 9A:
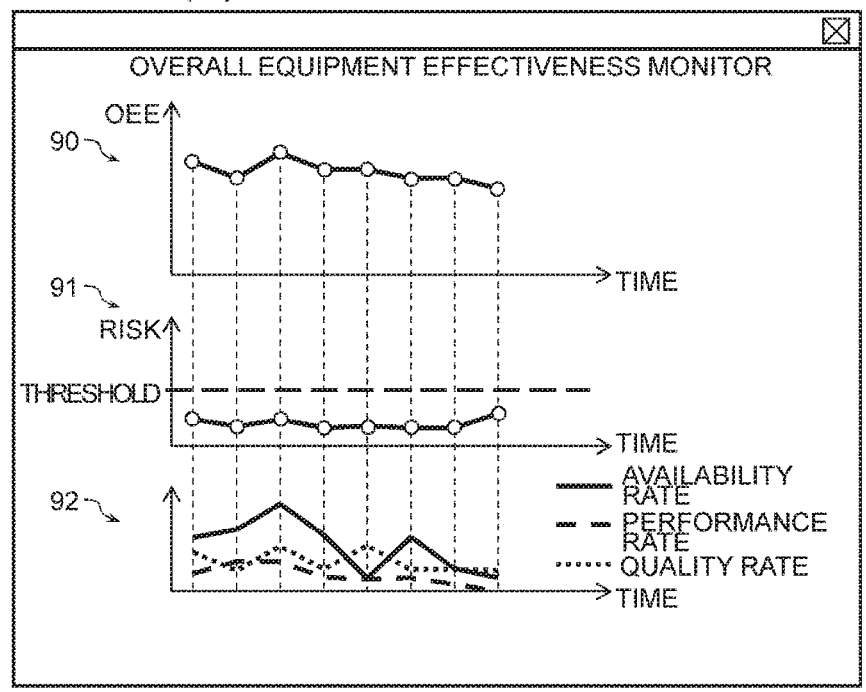
[FIG. 9] An example of an information output screen output from the information presentation unit.

FIG. 9(A) shows the basic screen. The graph 90 on the upper side is a time series graph of overall equipment effectiveness generated based on the data accumulated in the overall index storage unit 24. The horizontal axis represents time, while the vertical axis represents the value of overall equipment effectiveness (OEE). Monitoring this graph 90 enables detection of a change in the status of the overall production equipment. The graph 91 in the middle is a time series graph of abnormality occurrence risk generated based on the data accumulated in the risk storage unit 25. The horizontal axis represents time, while the vertical axis represents the degree of risk. One can see from this graph 91 whether or not the production equipment 2 is in a stable status. The graph 92 on the lower side shows respective time series lines of availability rate, performance rate, and quality rate generated based on the data accumulated in the operation results storage unit 23. The horizontal axis represents time, while the vertical axis represents effectiveness.

Figure 9B:
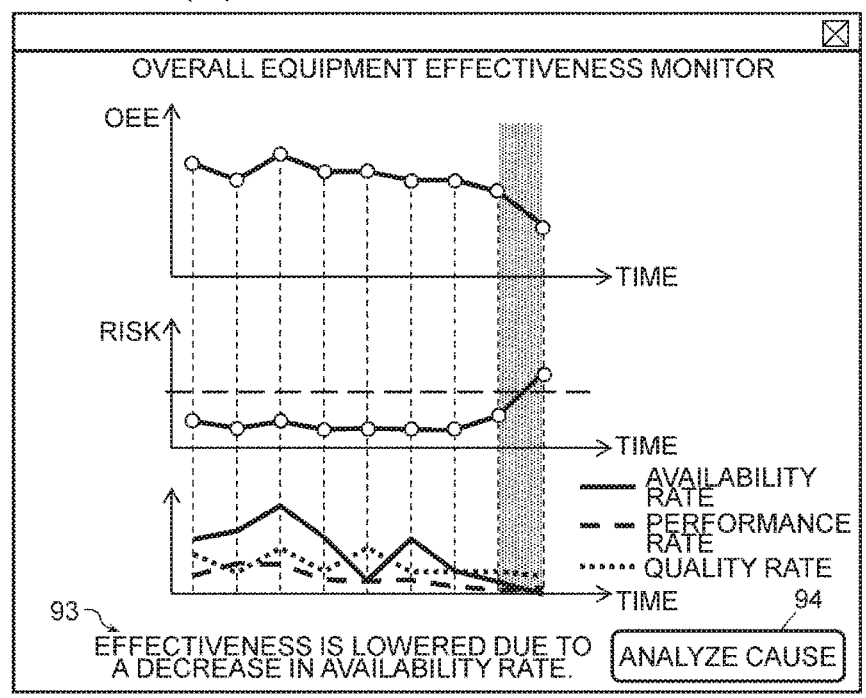

FIG. 9(B) shows an example of display when a change point is detected. A section in question in the OEE time series graph 90 is indicated with hatching, to clearly show the time point when a change in the status occurred. Also indicated is the information regarding notable index(es) considered to be the cause of the change in the status based on the analysis results in the analysis results storage unit 26. In the example of FIG. 9(B), the availability rate has been selected as a notable index, and a message 93 saying "Effectiveness is lowered because of a reduction in availability rate" is shown at the bottom of the screen.

Figure 10:
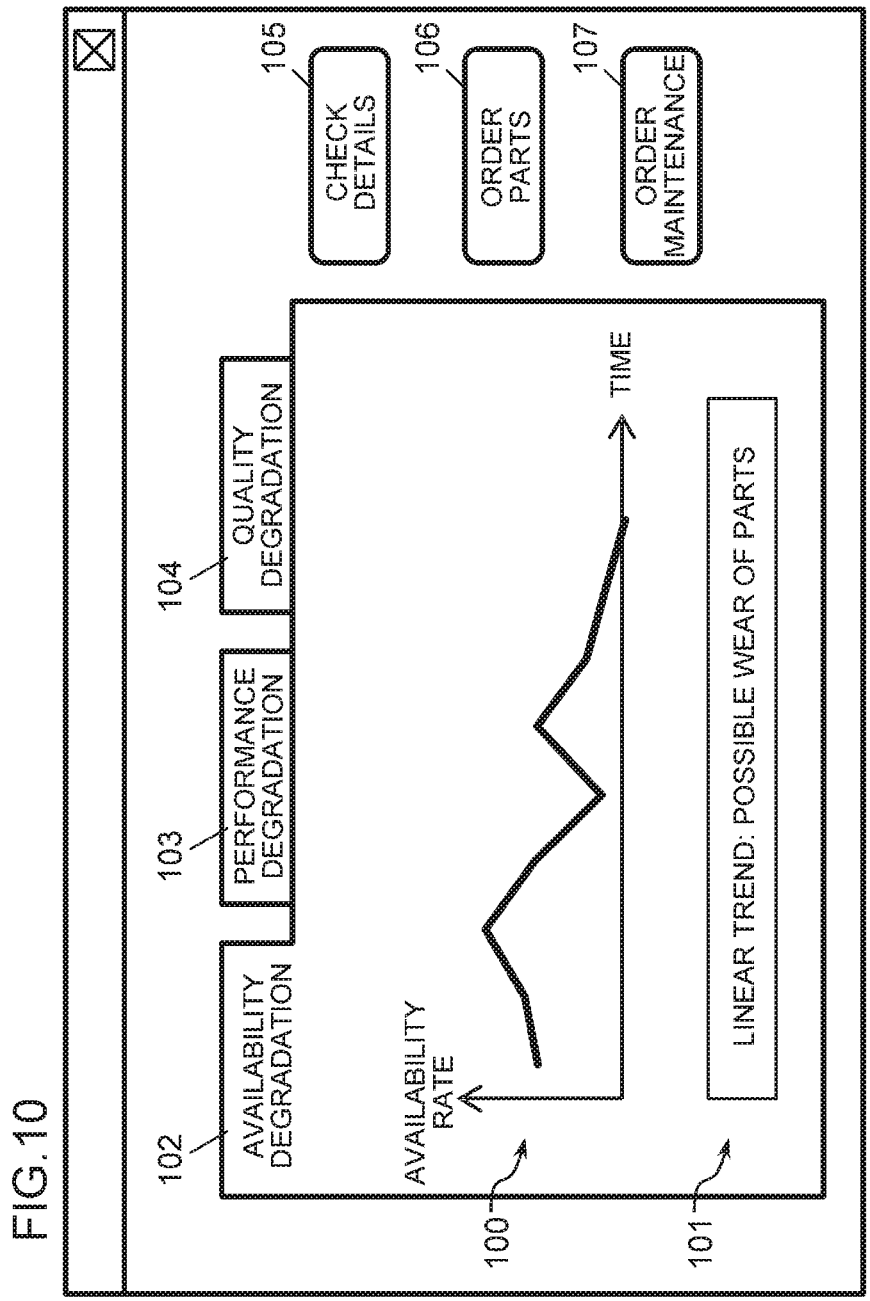
[FIG. 10] An example of an information output screen output from the information presentation unit.

FIG. 10 shows an example of a screen displayed when "Analyze cause" button 94 is pressed in the screen of FIG. 9(B). When "Analyze cause" is pressed, the information presentation unit 17 reads in time series data of notable index(es) from the operation results storage unit 23 and generates a time series graph of notable index(es), as well as generates information indicative of the variation trend of the notable index(es) and possible causal events assumed from the trend, based on the analysis results data (FIG. 7(A)) and the causal event table (FIG. 8). In the example of FIG. 10, information 101 saying "Linear trend: Possible wear of parts" is shown with the time series graph 100 of the availability rate.

Pressing "Operation degradation" tab 102, "Performance degradation" tab 103, or "Quality degradation" tab 104 on this screen can switch the index being displayed. Preferably, switching to indexes that are not notable indexes (not causing the status change) should not be allowed. Pressing "Check details" button 105 displays more detailed information regarding the causal events. For example in FIG. 11(A), observation data such as vibration and sound in a section in question of the production equipment 2 are displayed. By checking such observation data, whether or not there is an abnormality in the production equipment 2 can be determined. Pressing "Order parts" button 106 or "Order maintenance" button 107 will display an assisting screen for placing an order for parts or maintenance. In the example of FIG. 11(B), a list of parts makers for each type of parts is provided, so that an order can be placed for parts by inputting the number of parts and pressing "Place order" button 110.

The monitoring system 1 may further include a process execution unit that takes an appropriate measure in accordance with the causal event. More specifically, processes to be executed by the monitoring system 1 for each causal event may be defined and included in the causal event table. Once a causal event is specified through analysis of the time series data of notable indexes, the process execution unit activates the applicable process. Possible measures that may be taken in the event of a malfunction of the equipment include, for example, automated ordering of parts or arrangement of maintenance (sending notice to a person in charge via email or phone), sudden stop or fallback operation of the equipment, and so on.

<Advantages of the System>

According to the system described above, the monitoring of the status of the production equipment 2 can be realized only by observing the operation results (availability rate, performance rate, and quality rate) of the production equipment 2. Since a change point is detected with the use of an overall index (overall equipment effectiveness) obtained by combining a plurality of indexes, a change in the status of the production equipment 2 that may be difficult to evaluate from individual indexes can be correctly detected. A notable index is specified by the level of contribution to the change in the overall index based on an analysis of time series data, so that the cause of the abnormality that may be difficult to determine from individual indexes can be easily and correctly found out. Moreover, the system provides useful information for the user to specify the cause of the change in the status of the production equipment 2, such as time series data of notable indexes, variation trend, and causal events, so that users without special knowledge can easily understand and deal with a problem. Furthermore, since the system eliminates the necessity of installing an observation system such as sensors in the production equipment 2, the monitoring system 1 can have higher versatility, applicability, and extendibility.

<Variation Example>

The configuration in the embodiment described above is shown only to illustrate one specific example of the present invention and not intended to limit the scope of the present invention. The present invention can adopt various specific configurations without departing from the technical concepts of the present invention.

For example, while the status of the production equipment is monitored using an overall index that is a combination of three indexes, availability rate, performance rate, and quality rate in the embodiment described above, the type of index and monitoring target are not limited to these. The present invention can be applied to all sorts of monitoring targets as long as operation results (outputs) are observable. For example, a process step configured by a plurality of production equipment or an overall production line may be set as the monitoring target, or an entire factory having a plurality of production lines may be selected as the monitoring target. Furthermore, the invention is applicable also to the fields other than FA (such as agricultural farms). The type and number of indexes acquired as operation results, and the method of calculating the overall index can be suitably designed in accordance with the monitoring target and monitoring purposes. For example, while operation results per time are evaluated in the embodiment described above, operation results per consumed energy may be used as an index. Namely, operating time, performance, quality or the like per unit energy may be regarded as operation results.

REFERENCE SIGNS LIST

1: Monitoring system 2: Production equipment 10: Operating time acquisition unit, 11: Quality information acquisition unit, 12: Production plan information acquisition unit, 13: Operation results acquisition unit, 14: Overall index generation unit, 15: Change point detection unit, 16: Abnormality cause analysis unit, 17: Information presentation unit 20: Operation history storage unit, 21: Quality history storage unit, 22: Production plan storage unit, 23: Operation results storage unit, 24: Overall index storage unit, 25: Risk storage unit, 26: Analysis results storage unit, 27: Causal event table storage unit

The invention claimed is:

1. A monitoring system, comprising:
a processor; and
a memory storing a program which, when executed by the processor, causes the monitoring system to perform operations comprising operations to:
acquire time series data of each of a plurality of indexes comprising an availability rate, a performance rate, and a quality rate that indicate operation results of a monitoring target;
produce time series data of an overall equipment effectiveness by multiplying the availability rate, the performance rate, and the quality rate at a same time point based on the time series data of each of the plurality of indexes;
analyze the time series data of the overall equipment effectiveness, and detects a point where a significant change appears in overall equipment effectiveness values of the overall equipment effectiveness as a change point in a status of the monitoring target;
analyze the time series data of the plurality of indexes and the time series data of the overall equipment effectiveness when the change point is detected in the status of the monitoring target; and
select, from the plurality of indexes, one or more indexes with a high level of contribution to the change in the overall equipment effectiveness at the change point as a notable index relevant to a cause of the change in the status of the monitoring target, wherein
the monitoring system further comprises a storing device storing a causal event table in which types of indexes, trends in variation, and causal events are corresponded to one another; and
the program, when executed by the processor, causes the monitoring system to perform operations further comprising operations to:
analyze a variation trend of the time series data of the notable index;
specify a causal event as an assumed cause of the change in the status of the monitoring target by finding a causal event corresponded to the variation trend of the notable index from the causal event table; and
output information comprising a graph of the notable index.

2. The monitoring system according to claim 1, wherein the information comprises information regarding the specified causal event.

3. The monitoring system according to claim 1, wherein the program, when executed by the processor, further causes the monitoring system to execute a process for dealing with the causal event.

4. A monitoring method, comprising:
- an operation results acquisition step in which a computer acquires time series data of each of a plurality of indexes comprising an availability rate, a performance rate and a quality rate that indicate operation results of a monitoring target;
- an overall index generation step in which the computer produces time series data of an overall equipment effectiveness by multiplying the availability rate, the performance rate and the quality rate at a same time point based on the time series data of each of the plurality of indexes;
- a change point detection step in which the computer analyzes the time series data of the overall equipment effectiveness, and detects a point where a significant change appears in overall equipment effectiveness values of the overall equipment effectiveness as a change point in a status of the monitoring target;
- a cause analysis step in which the computer analyzes the time series data of the plurality of indexes and the time series data of the overall equipment effectiveness when the change point is detected in the status of the monitoring target in the change point detection step, and selects, from the plurality of indexes, one or more indexes with a high level of contribution to the change in the overall equipment effectiveness at the change point as a notable index relevant to a cause of the change in the status of the monitoring target;
- a causal event table acquisition step in which the computer acquires a causal event table in which types of indexes, trends in variation, and causal events are corresponded to one another, from a storage;
- a variation trend analysis step in which the computer analyzes a variation trend of the time series data of the notable index and specifies a causal event as an assumed cause of the change in the status of the monitoring target by finding a causal event corresponded to the variation trend of the notable index from the causal event table; and
- an output step in which the computer outputs information comprising a graph of the notable index.

5. A non-transitory computer-readable storage medium storing a program causing a computer to execute each of the steps of a monitoring method, comprising:
- an operation results acquisition step in which a computer acquires time series data of each of a plurality of indexes comprising an availability rate, a performance rate and a quality rate that indicate operation results of a monitoring target;
- an overall index generation step in which the computer produces time series data of an overall equipment effectiveness by multiplying the availability rate, the performance rate and the quality rate at a same time point based on the time series data of each of the plurality of indexes;
- a change point detection step in which the computer analyzes the time series data of the overall equipment effectiveness, and detects a point where a significant change appears in overall equipment effectiveness values of the overall equipment effectiveness as a change point in a status of the monitoring target;
- a cause analysis step in which the computer analyzes the time series data of the plurality of indexes and the time series data of the overall equipment effectiveness when the change point is detected in the status of the monitoring target in the change point detection step, and selects, from the plurality of indexes, one or more indexes with a high level of contribution to the change in the overall equipment effectiveness at the change point as a notable index relevant to a cause of the change in the status of the monitoring target;
- a causal event table acquisition step in which the computer acquires a causal event table in which types of indexes, trends in variation, and causal events are corresponded to one another, from a storage;
- a variation trend analysis step in which the computer analyzes a variation trend of the time series data of the notable index and specifies a causal event as an assumed cause of the change in the status of the monitoring target by finding a causal event corresponded to the variation trend of the notable index from the causal event table; and
- an output step in which the computer outputs information comprising a graph of the notable index.

\* \* \* \* \*